United States Patent [19]

Watanabe

[11] Patent Number: 4,982,228
[45] Date of Patent: Jan. 1, 1991

[54] AUTOMATIC ORIGINAL SHEET FEEDER FOR SETTING SHEET AT THE CENTRAL PORTION OF A PLATEN

[75] Inventor: Kazuo Watanabe, Tokyo, Japan

[73] Assignees: Fuji Photo Film Co., Ltd., Kanagawa; NISCA Corporation, Yamanashi, both of Japan

[21] Appl. No.: 415,388

[22] Filed: Sep. 28, 1989

Related U.S. Application Data

[62] Division of Ser. No. 195,316, May 18, 1988, abandoned.

[30] Foreign Application Priority Data

May 19, 1987 [JP] Japan .................................. 62-121764

[51] Int. Cl.⁵ ........................ G03B 27/32; G03B 27/52
[52] U.S. Cl. ........................................ 355/64; 355/50; 271/227; 271/258; 271/265
[58] Field of Search ............................ 355/50, 64, 65; 271/227, 258, 265

[56] References Cited

U.S. PATENT DOCUMENTS

| | | | |
|---|---|---|---|
| 3,623,806 | 11/1971 | Short | 355/64 |
| 4,073,391 | 2/1978 | O'Brien et al. | 271/246 X |
| 4,264,187 | 4/1981 | Rhodes, Jr. | 271/245 X |
| 4,606,536 | 8/1986 | Ohara | 271/246 X |
| 4,653,008 | 3/1987 | Koi et al. | 271/227 X |
| 4,731,639 | 3/1988 | Gutmann et al. | 355/64 |
| 4,786,042 | 11/1988 | Stemmle | 271/171 X |

FOREIGN PATENT DOCUMENTS

| | | | |
|---|---|---|---|
| 0212331 | 12/1984 | Japan | 271/171 |
| 0203032 | 9/1986 | Japan | 271/171 |

*Primary Examiner*—Monroe H. Hayes
*Attorney, Agent, or Firm*—Sughrue, Mion, Zinn, Macpeak & Seas

[57] ABSTRACT

An automatic original sheet feeder for automatically feeding an original sheet to the central portion of a platen of an image reading apparatus is disclosed, in which the orignal sheet on an original sheet tray is supplied to the platen by a feeding device. The length of the original sheet is detected by a control unit. The required distance for the original sheet to be fed is calculated depending upon the distance from a predetermined position and the central portion of the platen and the length of the original sheet. The feeding device sends the original sheet to the platen by the calculated distance, and the central portion of the original sheet is made to coincide with the central portion of the platen.

8 Claims, 15 Drawing Sheets

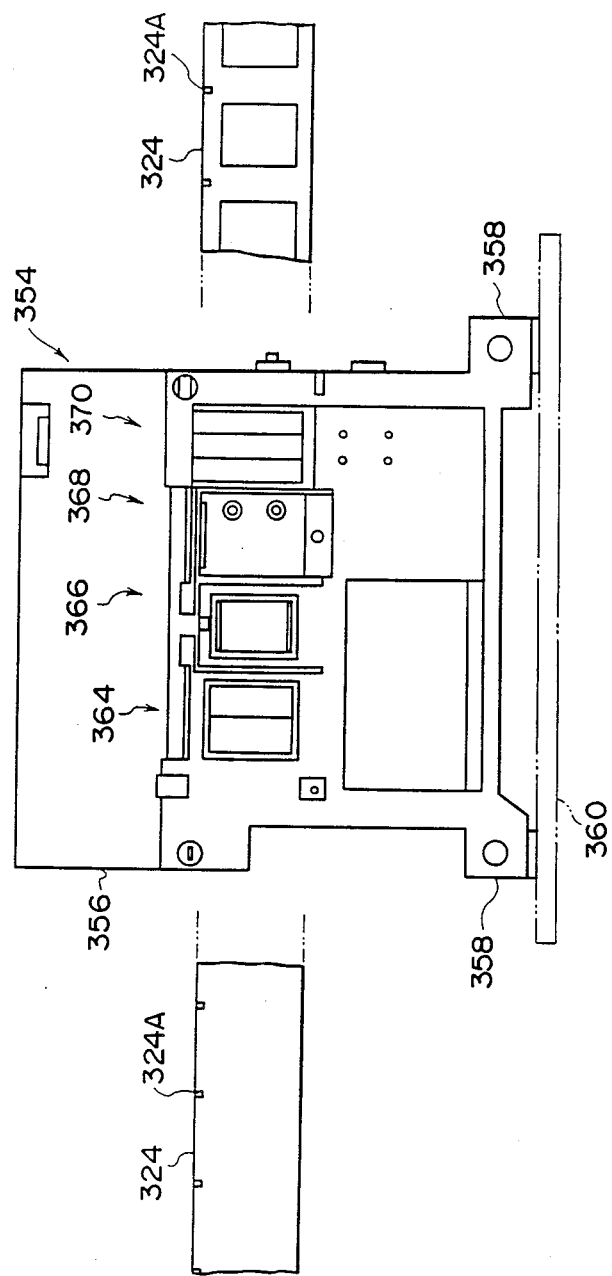

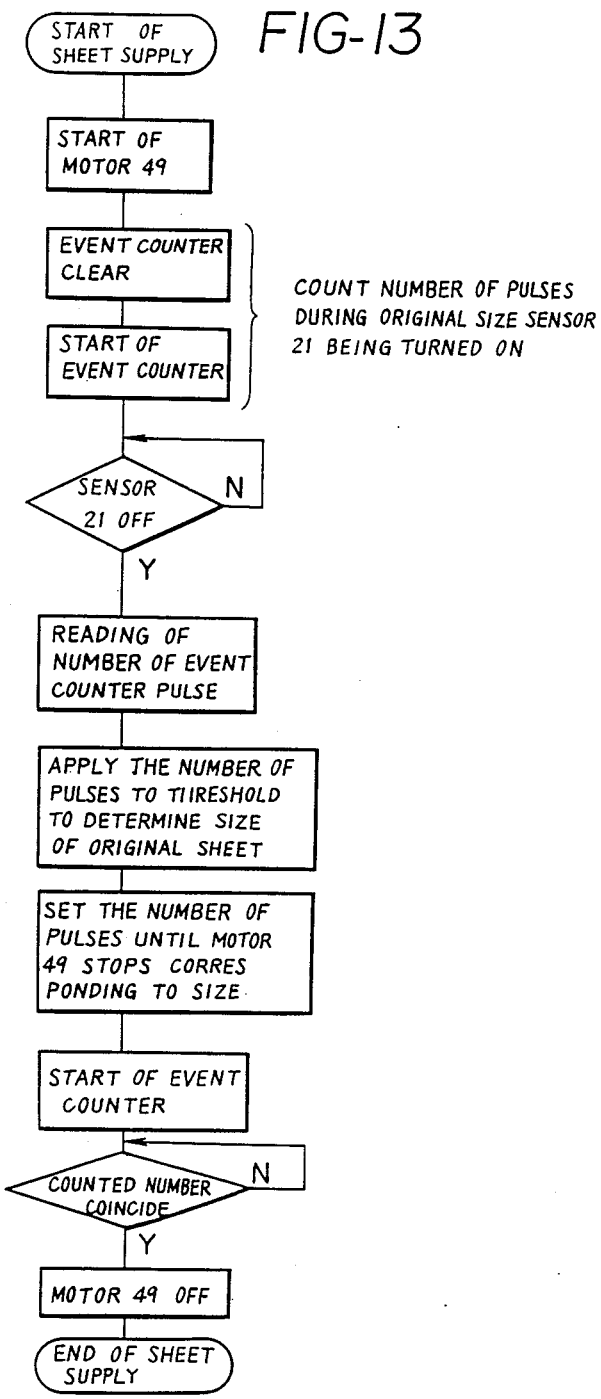

AUTOMATIC ORIGINAL SHEET FEEDER FOR SETTING SHEET AT THE CENTRAL PORTION OF A PLATEN

This is a division of application Ser. No. 195,316, filed May 18, 1988.

This invention relates to an automatic original sheet feeder for automatically feeding an original to a platen of an image processing apparatus such as a copying machine or an image reader.

In an electrophotographic type of image processing apparatus, it is most desirable for an original sheet to be set at the central portion of a platen.

A requirement of the type described above becomes strong especially in a case where the automatic original sheet feeder is applied to an electrophotographic apparatus disclosed such as in FIG. 9. That is, if an original sheet is set off the central portion of the platen, the original sheet may be recorded at an offset position in the vicinity of the end portion of a frame of an electrophotographic film since the central portion of the platen which serves as an original sheet holder corresponds to the central portion of the frame of an electrophotographic film.

Especially in a case where microimages are formed, the size of a frame of an electrophotographic film is substantially 9 mm × 12 mm. The peripheral portions of frames will frequently suffer from a lack of uniformity of charge generated in a charge process, a leaking of developer in a development process, uneven dried portions in a drying process, or insufficient fixation in a fixing process. If the defects described above occur in a peripheral portion of 1 to 2 mm of a frame, the image will be damaged. Therefore, in order to prevent the defects described above from occurring, the image may be formed at a position at which none of the above-described defects occur, that is, the image may be formed as nearly as possible to the central portion of a frame of an electrophotographic film. The easiest and most convenient way to form an image at the central portion of a frame is to stop the original sheet at the central portion of a platen regardless of the size of the original sheet.

However, since, in conventional automatic original sheet feeders, only original sheets of predetermined size are arranged to be set, or even if the different sized original sheets are arranged to be fed, the front end of the original sheet is arranged to be stopped at the end portion of the platen, the requirements described above cannot be satisfied. That is, in the conventional original sheet feeders, the front end of the original sheet is brought into contact with the stopper on the platen so that the original sheet is stopped, or a feeding motor is stopped when the front end of the original sheet reaches the end portion of the platen as shown in U.S. Pat. Nos. 3,674,363, 4,455,018, 4,667,951, 3,844,552 and 4,344,703.

It is therefore an object of the present invention to provide an automatic original sheet feeder in which a central portion of an original sheet can be stopped in accordance with a certain position (in general at the central portion of a platen) in successively feeding variously sized original sheets to a platen.

This invention comprises: an automatic original sheet feeder for automatically feeding an original sheet to a platen of an image processing apparatus comprising:

(a) an original sheet tray for stacking an original sheet;

(b) feeding means for moving the original sheet on the original sheet tray to said platen;

(c) sheet delivery means for delivering the original sheet on the platen; and (d) control means for calculating the distance for the original sheet to be fed which is required to locate the original sheet at a predetermined position on the platen depending upon the length of the original sheet and the distance from a predetermined position to the predetermined position on the platen and activating the feeding means by the distance of said original sheet to be fed.

Therefore, in the present invention, when the length of an original sheet is determined, the required distance for the original sheet to be fed is calculated depending upon the distance from a predetermined position to the central portion of the platen and the length of the original sheet. By feeding the required distance of the original sheet to be fed by feeding means (a motor or the like), the central portion of the original sheet can be made to coincide with the central portion of the platen. Therefore, the original image which has been photographed can be located at the central portion of the frame of a film.

By making the transverse central portion of the original sheet coincide with the central portion of the platen before the original sheet is sent to the platen, the original image can be, also in the transverse direction, made to coincide with the central portion of the frame of the film.

Although the length of the original sheet can be determined by an operator inputting with a control keyboard or the like, it can also be easily calculated with the use of the distance of the original sheet which is fed for a predetermined time period by detecting the front and rear ends of the original sheet when the original sheet is fed. Therefore, provided that the distance from the above-described predetermined position to the central portion of the platen is constant, the lengths of the original sheets to be fed can be previously stored to form a table in the memory of a control unit, and the required distance for an original sheet to be fed can be drawn from the table immediately after the length of the original sheet has been recognized in cases where the length of the original sheets is previously known.

BRIEF DESCRIPTION OF THE DRAWINGS

FIGS. 1 to 7 illustrate an embodiment of the present invention, wherein;

FIG. 1 is a view illustrating the whole structure of an automatic original sheet feeder;

FIG. 2 is a view illustrating the structure of an original sheet tray;

FIG. 3 is a view illustrating the structures of a driving device and conducting means;

FIG. 4 is a view illustrating the structures of the sheet delivery side of a transporting portion and a sheet delivery tray;

FIG. 5 is a view illustrating the relationship between a sheet delivery roller and a sheet delivery guide;

FIG. 6 is a view illustrating the structure of a portion in the vicinity of a platen of an image processing apparatus;

FIG. 7 is a timing chart illustrating the operation;

FIG. 11 is a front view of a process head;

FIG. 13 is a flow chart illustrating the operation procedure according to another embodiment.

PREFERRED EMBODIMENT OF THE INVENTION

A case in which an automatic original sheet feeder according to an embodiment of the present invention is applied to an electrophotographic type of image processing apparatus will now be described with reference to the drawings.

Figure 9:
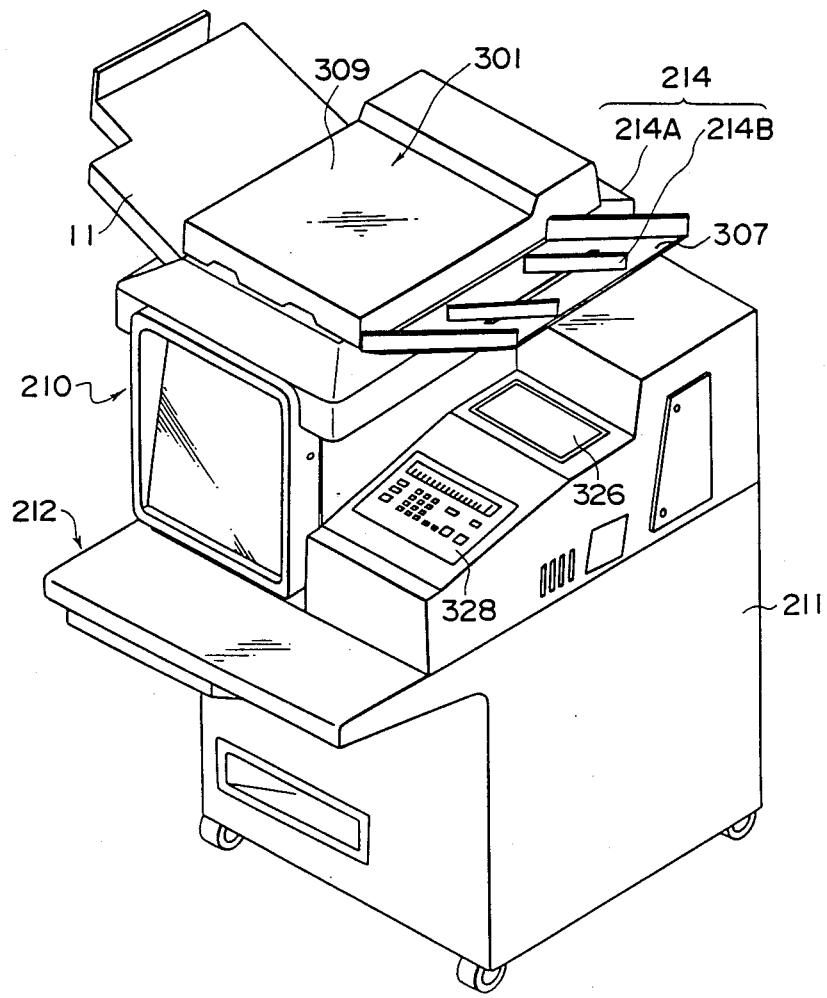
FIG. 9 is a perspective view illustrating an electrophotographic apparatus to which the present invention is applied.

FIG. 9 shows an electrophotographic apparatus to which an automatic original sheet feeder according to an embodiment is applied. This apparatus comprises: a camera function for photographing an original sheet to record the image on an electrophotographic film; a reader function for projecting the image which has been recorded on the electrophotographic film by enlarging it on a screen; and a copying function for copying the image which has been recorded on the electrophotographic film on a copying sheet in an enlarged manner.

The electrophotographic apparatus is so constituted that a main electrophotographic apparatus body 210 and a copying device 212 are integrally formed, a housing 211 of the copying device 212 serving to be a frame on which the main electrophotographic apparatus body 210 is mounted. In a case where no copying function is needed, it is arranged that the main electrophotographic apparatus body 210 can solely be used. A housing 214 of the main electrophotographic apparatus body 210 is constituted by a portion 214A located to the left and in the parallelepiped-like form and a portion 214B located to the right and having a step-like upper surface. The spaces in the two portions 214A and 214B are connected to each other in the rear portion.

A transparent type of screen is provided in the outer portion of the housing 214A, the screen covering the opening in the front area of the housing 214A, and being slightly tilted rearward. An automatic original sheet feeder 301 according to the present invention is disposed in the upper portion of the housing 214A. The automatic original feeder 301 comprises: an original sheet tray 307 to which original sheets are set; a transporting portion 309 for transporting the thus-set original sheet, and a sheet delivery tray 11 for accommodating the original sheet which has been delivered from the transporting portion 309. The original sheet tray 307 and the transporting portion 309 are formed integrally and they are able to be opened. Beneath the transporting portion 309, a platen 305 is provided which forms the upper portion of the main electrophotographic apparatus 210, and which is made of a transparent glass plate. In the outer portion of the housing 214B, a cassette holding portion 326 in which a cassette accommodating an electrophographic film 324 is held is formed in the vicinity of the central portion of the upper portion. A control keyboard 328 for operating various functions of the electrophotographic apparatus is located in the upper front portion of the housing 214B. A cassette of the type described above in which an electrophotographic film of the type described above is accommodated is in detail disclosed in U.S. Pat. No. 4,685,638.

An opening 332 through which copying sheets to which the original sheets are copied are delivered is formed in the housing 211 of the copying device 212.

Figure 10:
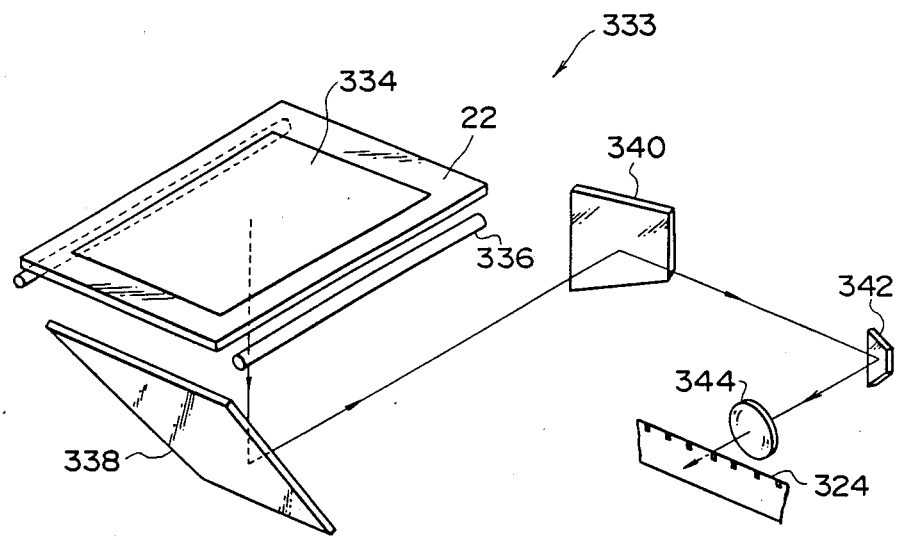
FIG. 10 is a perspective view of an optical system for photographing.
Figure 12A:
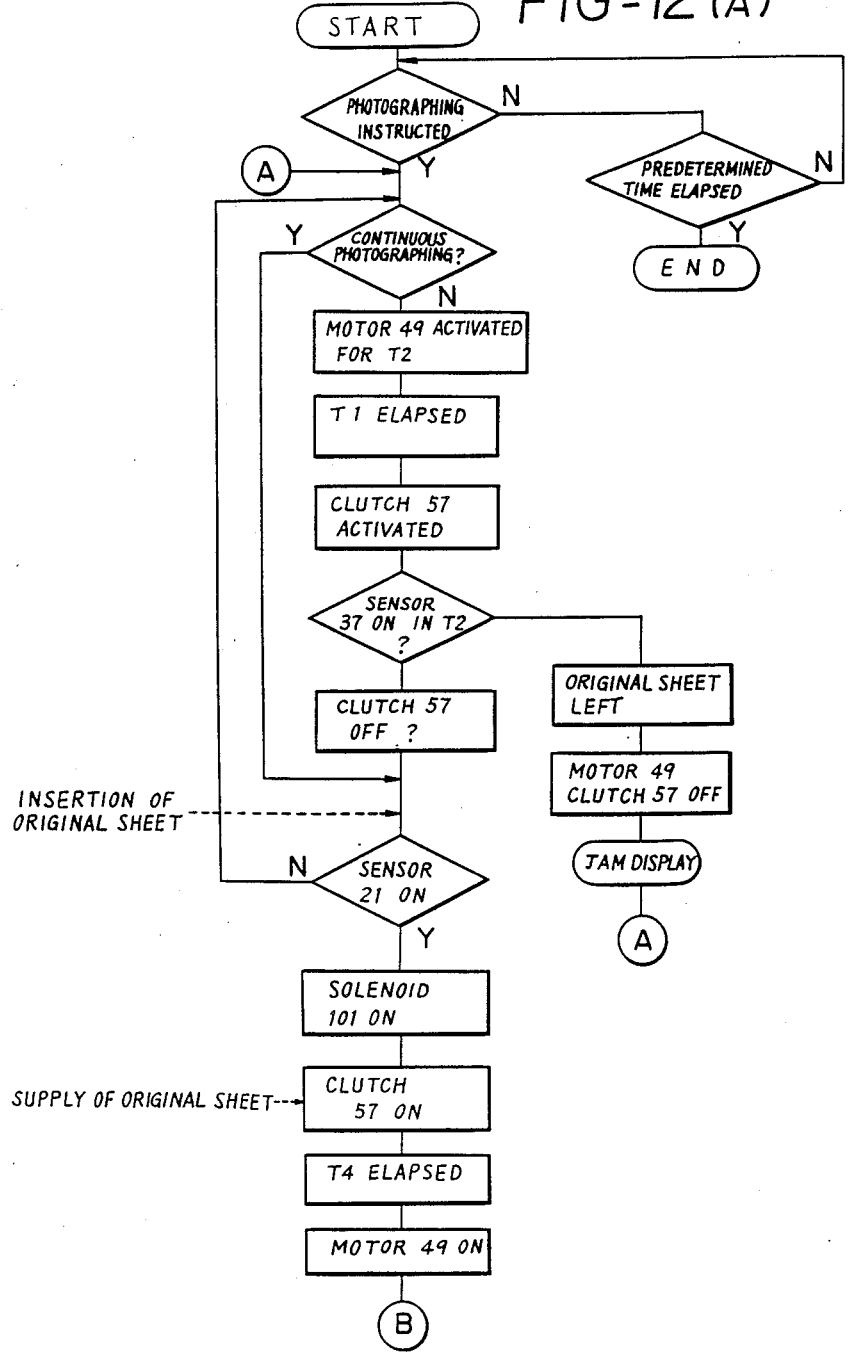
FIG. 12 is a flow chart illustrating the operation procedure.
Figure 12B:
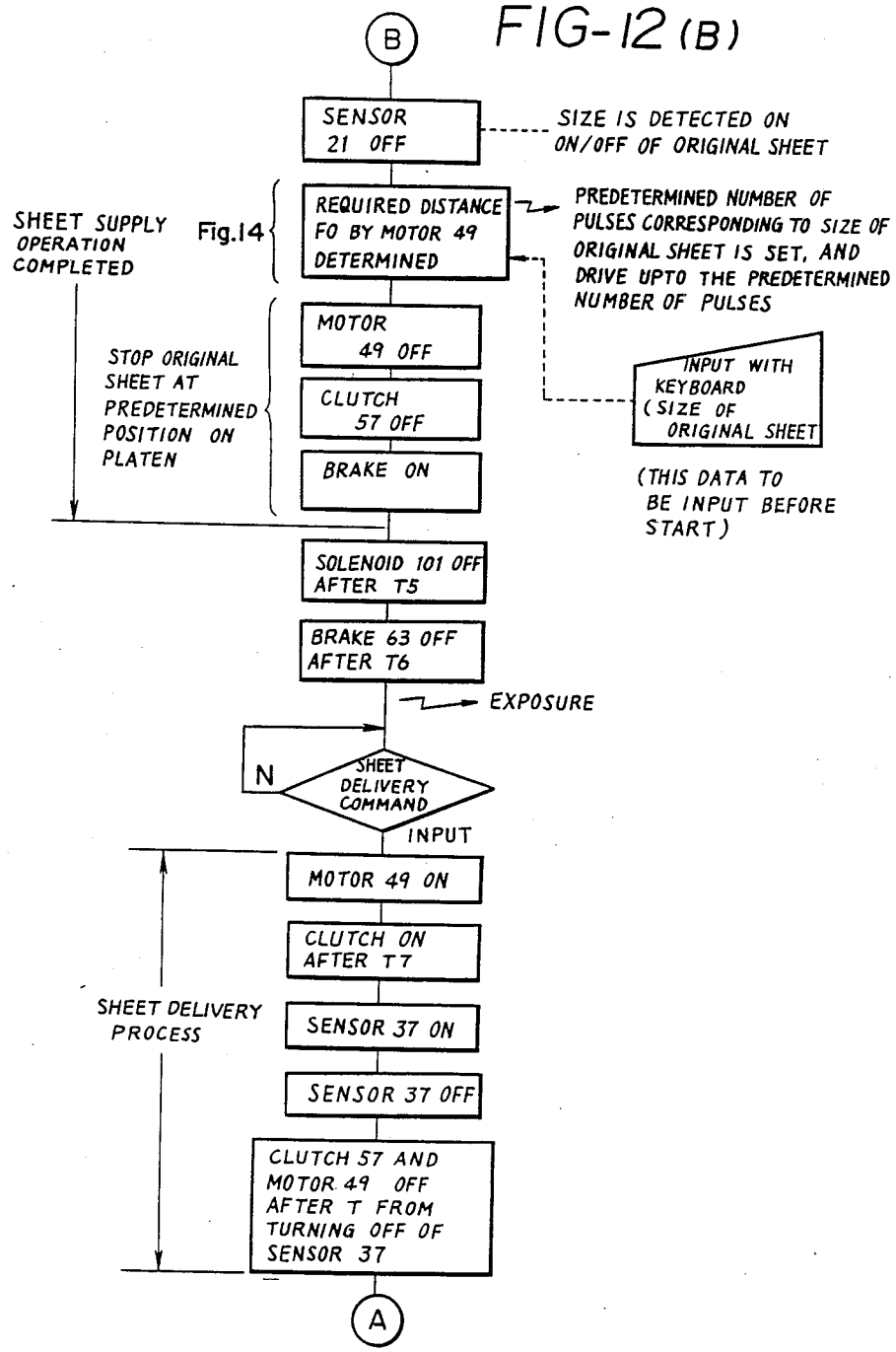

In FIG. 10, a photographing optical system 333 of the electrophotographic apparatus is shown.

As shown in FIG. 10, the photographing optical system comprises: an original sheet illuminating lamp 336 for illuminating an original sheet 334 which is a subject, and which is set in such a manner that the original-written side faces downwardly; a third mirror 338 upon which the reflection light from the original sheet 334 is made incident; a second mirror 340 upon which the reflection light from the third mirror 338 is made incident; a first mirror 342 upon which the reflection light from the second mirror 340 is made incident; and a main lens for focusing the reflection light from the first mirror 342 on the surface of the electrophotographic film 324.

In FIG. 11, a process head according to an embodiment provided for the electrophotographic apparatus is shown.

A process head 354 is constituted integrally by a main body 356 in the form of a relatively-flattened and substantially parallelepiped shape and a pair of leg portions 358 disposed in the lower portion of the main body 356, and is integrally formed by a synthetic resin from which the parts to-be fitted thereto are excluded. The process head 354 is disposed between the main lens 344 and the electrophotographic film 324 which are shown in FIG. 10. As shown in FIG. 11, the leg portions 358 are fitted to a frame 360 disposed in the housing 314B of the main electrophotographic apparatus body 310.

The electrophotographic film 324 is so constituted that a transparent electroconductive layer, an intermediate layer, and a photosensitive layer are successively stacked on a supporting body made of such as polyethylene, the photosensitive layer being formed by a photoelectric layer and a protection layer which protects this photoelectric layer. This electrophotographic film 324 is in the form of an elongated tape and accommodated in a cassette case.

As shown in FIG. 11, blip marks 324A are printed at constant intervals along the top edge line in the lengthwise direction of the electrophotographic film 324. One blip mark 324A corresponds in position to a frame of image to be recorded on the electrophotographic film 324. The electrophotographic film 324 is disposed in such a manner that the photosensitive layer thereof confronts the front side of the process head 354, and is able to move in the transverse direction of the process head 354 (lateral direction in FIG. 11) when a film-driving motor (omitted from illustration) is activated. The transparent electroconductive layer of the electrophotographic film 324 can be electrically connected with the main electrophotographic apparatus body 210 when the cassette is located in the main electrophotographic apparatus body 210. As the electrophotographic film, a known type of such a film can be, of course, used without limitation involved in the embodiment described above.

The main body 356 of the process head 354 is provided with, successively in the transverse direction, a charge/exposure portion 364, a development portion 366, a drying portion 368 and a fixing portion 370 at a predetermined pitch corresponding to one frame of the electrophotographic film 324.

Next, an automatic original sheet feeder for stopping the original sheet 334 at the central portion of the platen 305 will now be described with reference to FIGS. 1 to 8.

Figure 1:
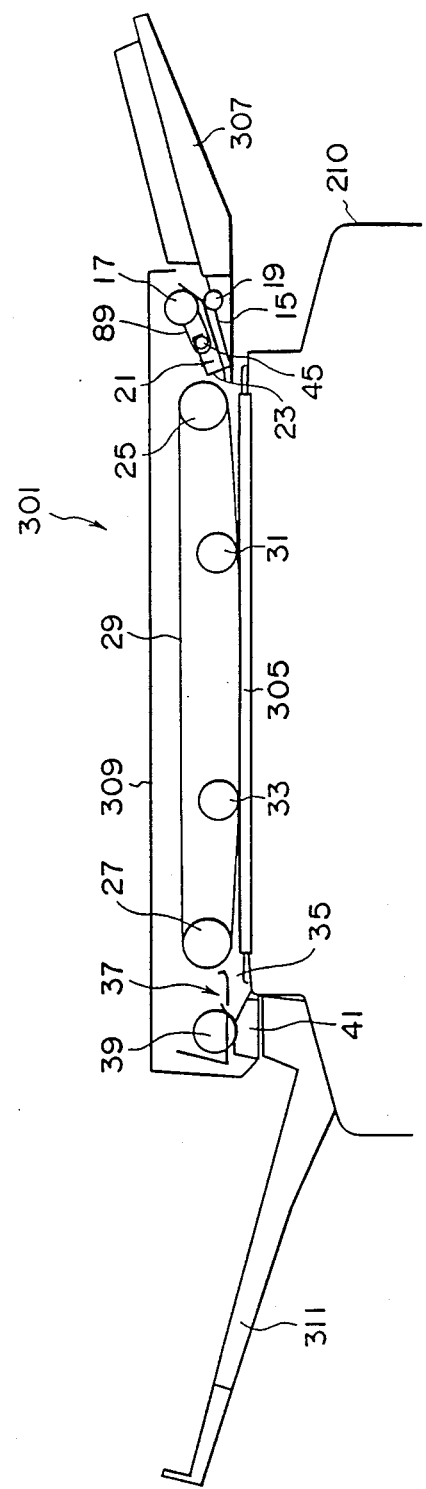

As shown in FIG. 1, the automatic original sheet feeder 301 is located above the platen 305 of the main electrophotographic apparatus body 210.

Figure 6:
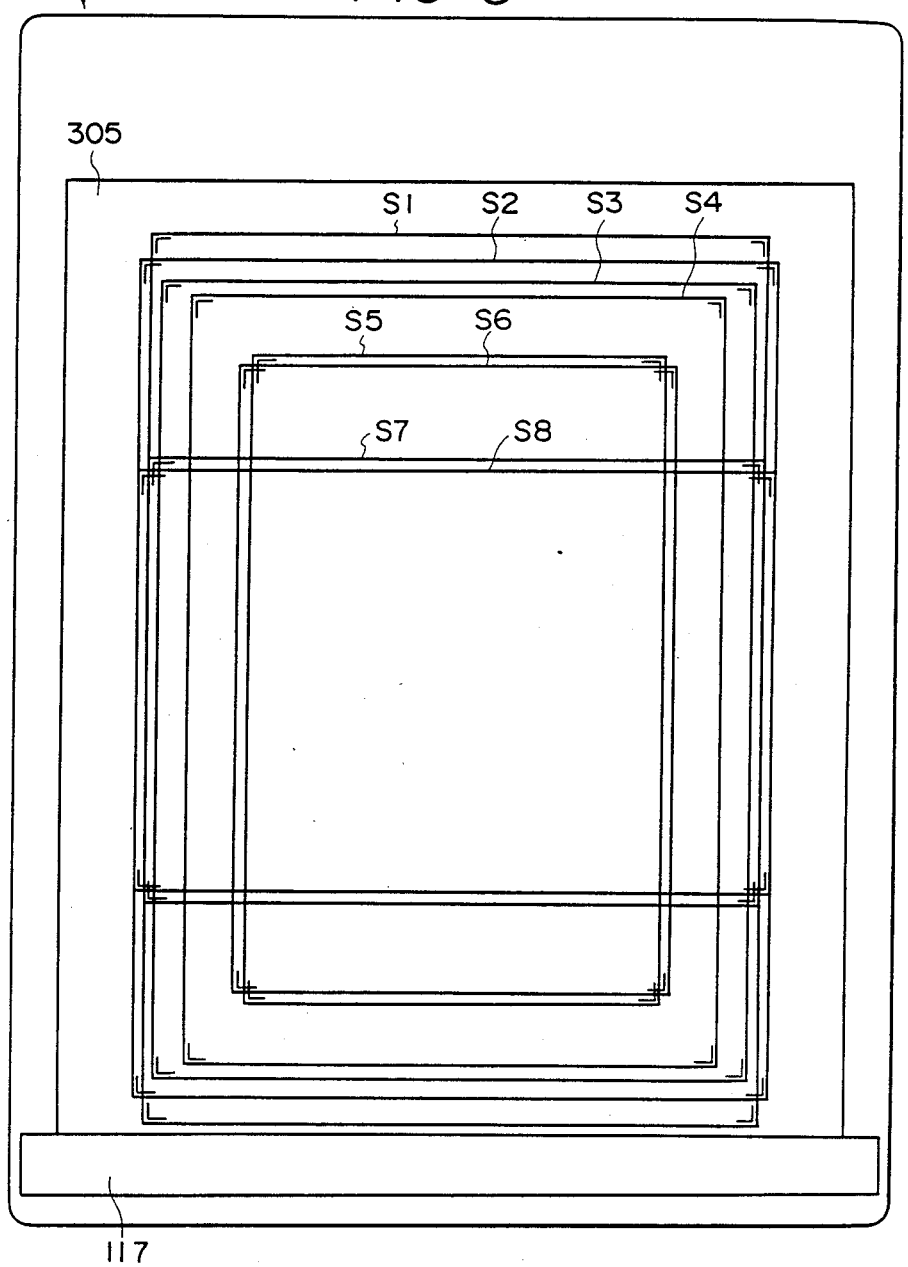
Figure 7:
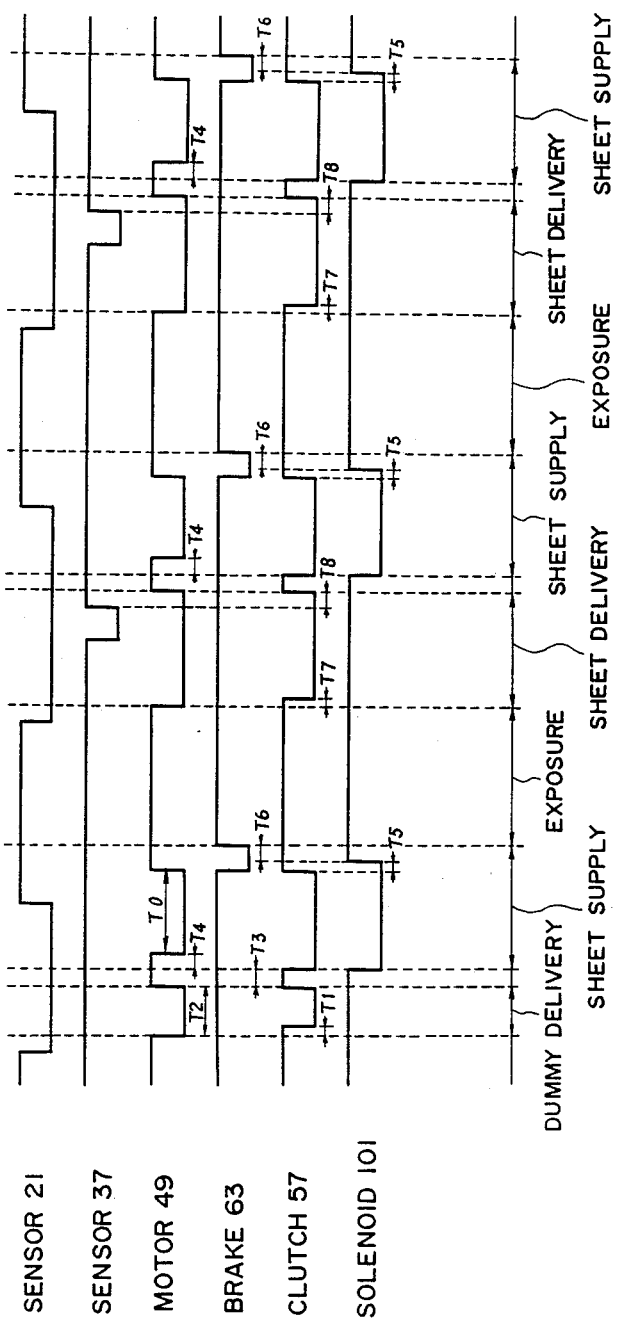

The main electrophotographic apparatus body 210 has functions of reading the contents of the original sheet which is set on the platen 305 and recording the contents in a recording medium (for example an organic photoelectric body or a magnetic tape), displaying the recorded information on a display, and copying the same. As shown in FIG. 6, a stopper 117 is provided in front of the platen 305, the stopper 117 serving as a reference at the time of manually setting the original sheets.

Figure 8:
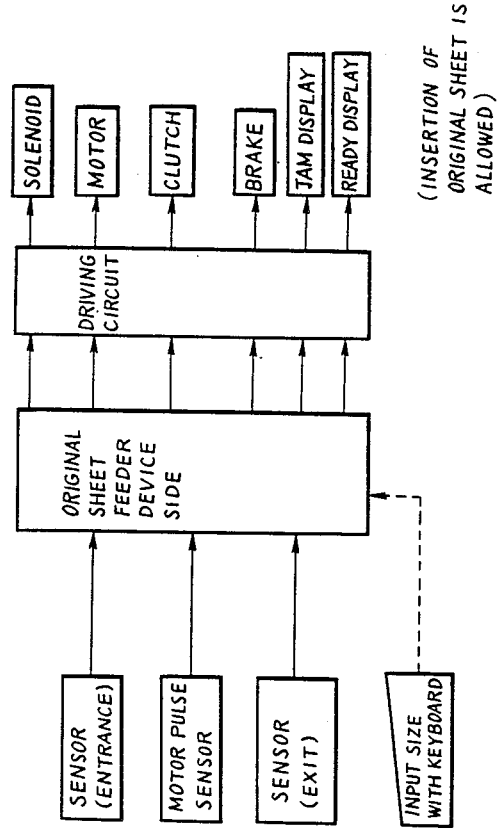
FIG. 8 is a circuit diagram illustrating a control unit and its related parts according to the present invention.

The main electrophotographic apparatus body 210 is arranged, as shown in FIG. 8, to make the automatic original sheet feeder 301 perform a sheet feeding action and a sheet delivery action by supplying a sheet supply command and a sheet delivery command from a control unit 218.

The automatic original sheet feeder 301 is, as shown in FIG. 6, arranged to automatically set the original sheet at the substantially central portion of the platen 305, the original sheet being such as transversely positioned (transversely to the sheet moving direction) original sheet S1 of A4 size, transversely-positioned original sheet S2 of letter size, transversely-positioned original sheet S3 of government letter size, transversely-positioned original sheet S4 of B5 size, transversely-positioned original sheet S5 of statement size, transversely-positioned original sheet S6 of A5 size, lengthwise positioned original sheet S7 of A5 size, and lengthwise positioned original sheet S8 of statement size.

After the exposure process by the photographing optical system 333 has been completed, that is, after the contents of the original sheet have been read, the original sheet is transported from the platen 305 to the sheet delivery tray 11. The automatic original sheet feeder 301 comprises: the original sheet tray 307 to which the original sheet is set; the transporting portion 309 for transporting the original sheet which has been set in the original sheet tray 307 along the platen 305; and the sheet delivery tray 11 for accommodating the original sheet delivered from the transporting portion 301.

The original sheet tray 307 and the transporting portion 309 are integrally formed, and are fitted on the inside of the upper surface of the main electrophotographic apparatus body 210 with hinges (omitted from the illustration) so that they can be opened and closed above the platen 305.

Figure 2:
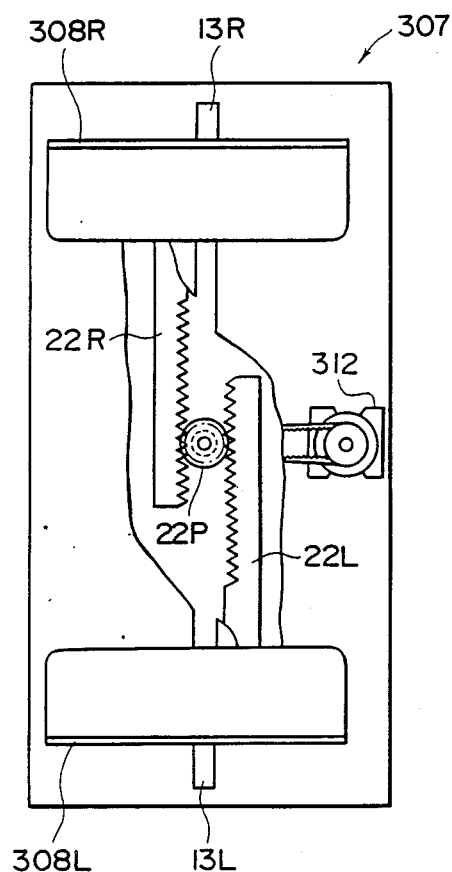

The original sheet tray 307, as shown in FIG. 2 comprises: a pair of a right and a left arrangement plates 308L and 308R which are movably provided along guide grooves 13L and 13R.

The arrangement plates 308L and 308R are arranged in such a manner that moving either of the two by means of racks 22L and 22R and a pinion 22P causes the other plate to be moved by the same distance. This pinion 22P is rotated by a rotational force by a motor 312, but, as an alternative, it may be rotated manually.

The transporting portion 309, as shown in FIG. 1, comprises: a sheet passage 15 for guiding the original sheet which has been set in the original sheet tray 307 to the platen 305; a sheet supplying roller 17 for transporting the original sheet which has been inserted into the sheet passage 15, the sheet supplying roller 17 being vertically movably provided; a follower roller 19 confronting the sheet supplying roller 17; a stopper 23 for stopping the front end of the original sheet which has been inserted into the sheet passage 15; a transporting endless belt 29 the two ends of which are supported by a rotatable supporter, for example, pulleys 25 and 27, and which transports along the platen 305 the original sheet which has been supplied from the sheet passage 15; press-rollers 31 and 33 for pressing the transporting belt 29 onto the platen 305; a sheet delivery passage 35 for delivering the original sheet transported by the transporting belt 29; a sensor for detecting the original sheet which has been supplied to the sheet delivery passage 35; a rotatable transporter, such as a sheet delivery roller 39, for delivering the original sheet which has been supplied to the sheet delivery passage 35; and a holding means such as a sheet delivery guide 41 which is provided confronting the sheet delivery roller 39, and, for holding the original sheet in cooperation with the sheet delivery roller 39.

Figure 3:
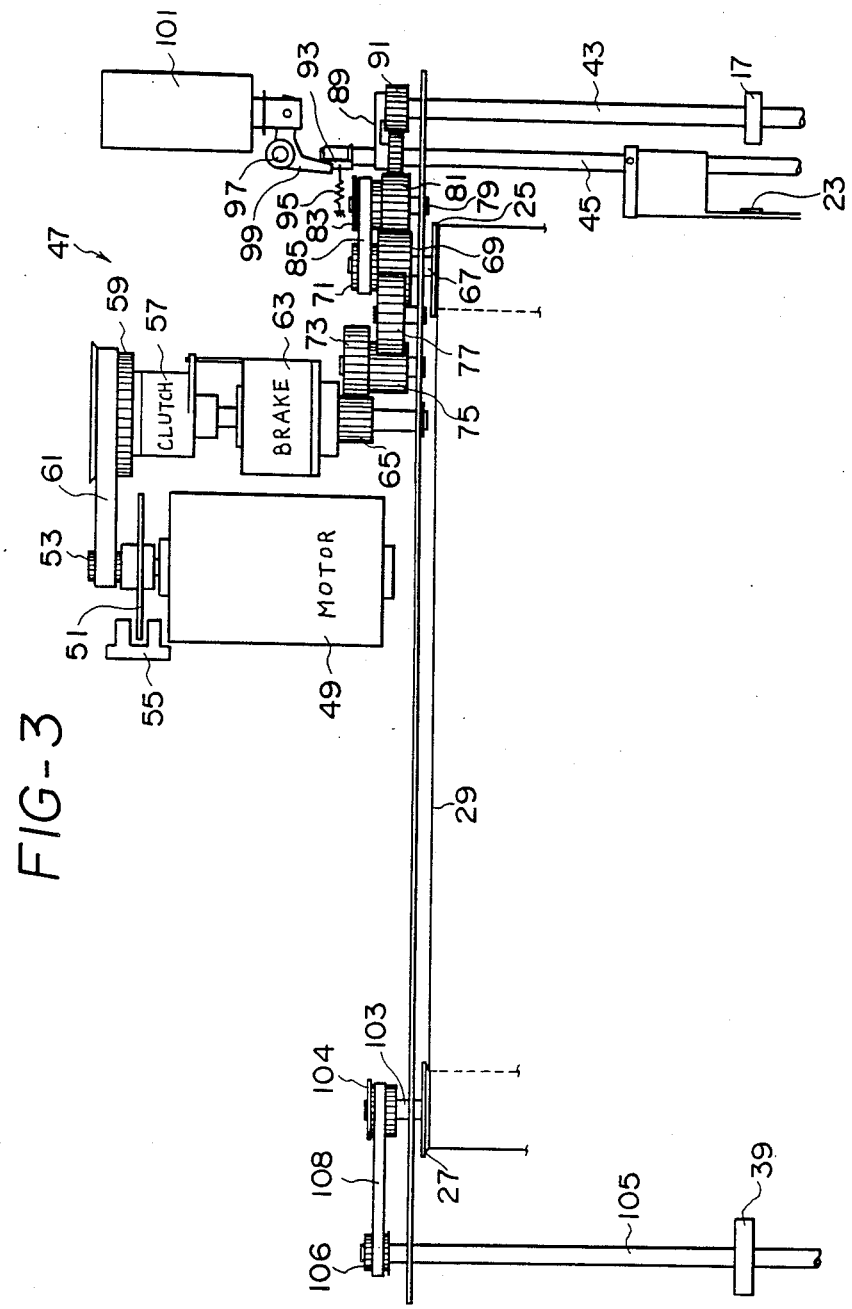

The sheet supplying roller 17 is, as shown in FIG. 3, fitted to a shaft 43, and the stopper 23 is fitted to a shaft 45. The shaft 43 is journalled to the front end of an arm 89 extending from the shaft 45. Therefore, when the shaft 45 is rotated clockwise in FIG. 1, the stopper 23 is raised so that the original sheet can be introduced, and simultaneously, the sheet supplying roller 17 is moved downwardly and brought into contact with the original sheet, whereby the force for transporting the original sheet is given. The two shafts 43 and 45 are arranged to be rotated by a driving device 47.

The driving device 47 comprises: a motor 49; a clock-plate 51 and a timing pulley 53 which are fitted to a rotational shaft of the motor 49, and the former of which is provided with a plurality of detecting holes; a sensor 55 (the clock-plate 51 and sensor 55 forms an encoder) for detecting the detection hole in the clock-plate 51; an electromagnetic clutch 57; a timing pulley 59 fitted to the input shaft of the electromagnetic clutch 57; a timing belt 61 which is arranged between the timing pulleys 53 and 59; an electromagnetic brake 63 fitted to the output shaft of the electromagnetic clutch 57; a gear 65 fitted to the rotational shaft of the electromagnetic brake 63; a gear 69 and a timing pulley 71 fitted to the rotational shaft 67 of the pulley 25; gears 73, 75, and 77 connecting the two gears 65 and 69; a gear 81 and a timing pulley 83 fitted to the rotational shaft 79; a timing belt 85 arranged between the two pulleys 71 and 83; a gear 87 which is rotatable with respect to the shaft 45, and which engages with the gear 81; an arm 89 connecting the two shafts 45 and 43; a gear 91 fitted to the shaft 43 so as to be engaged with the gear 87; an arm 93 fitted to the shaft 45; a spring 95 for urging the arm 93; a lever 99 which rotates relative to the shaft 97 so that the arm 93 is rotated; and a solenoid 101 for moving the lever 99. In a state in which electricity is not supplied to the solenoid 101, the stopper 23 is introduced into the original sheet passage due to the urging force of the spring 95 so that the front end of the original sheet is caught, causing the original sheet to be stopped and causing the sheet supplying roller 17 to move upwardly whereby this is positioned away from the original sheet. When the solenoid 101 is activated, the stopper 23 and the sheet supplying roller 17 starts seesaw movement so that the stopper 23 is moved upwardly, while the sheet supplying roller 17 is moved downwardly, whereby the original sheet is transported.

Figure 4:
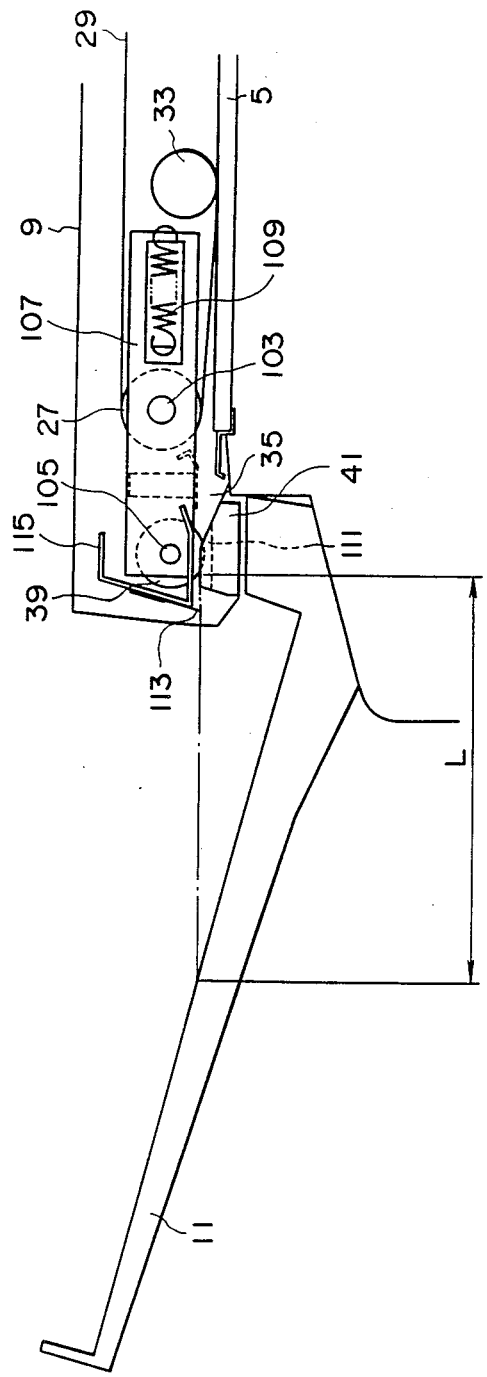

As shown in FIG. 4, a rotational shaft 103 of the pulley 27 and a rotational shaft 105 of the sheet delivery roller 39 are journalled in parallel by a connecting member 107, and are urged by a spring 109 to the sheet delivery tray 311. The spring 109 is located between a bracket 107 which supports the shaft 103 of the transporting belt supporting pulley 27 adjacent to the sheet delivery tray 311 and a frame (omitted from the illustration), and urges the transporting belt with a constant tension so as to prevent the transporting belt from looseness.

The one ends of the rotational shafts 103 and 105 are, as shown in FIG. 3, respectively provided with timing pulleys 104 and 106 which are connected so as to be rotated in a connected manner by a conducting means, such as a timing belt 108.

Figure 5:
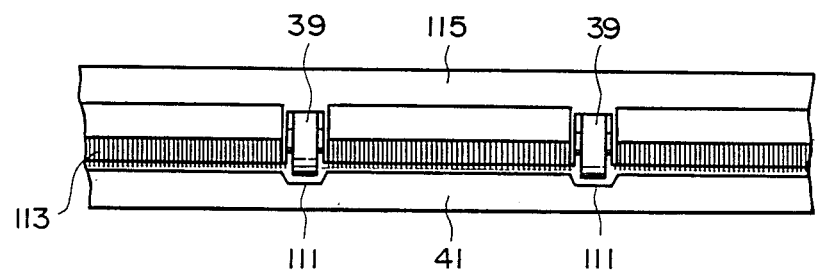

A recess 111 is, as shown in FIG. 5, provided in the portion confronting the sheet delivery roller 39 of the sheet delivery guide 41 so that the sheet delivery roller 39 and the recess 111 are, as shown in FIG. 4, aligned in position. As described above, since the recess 111 of the sheet delivery guide 41 and the sheet delivery roller 39 are aligned, the original sheet delivered is shaped in a waveform at the recess 111 which confronts the sheet delivery roller 39. As a result of this, the original sheet is made firm, whereby the sheet becomes easy to be transported and it can be assuredly delivered to a delivery stacker 11.

Furthermore, an electricity removing brush 113 is fitted to a frame 115.

The sheet delivery tray 11 is, as shown in FIG. 4, slanted at the angle at which the distance L from the point at which the original sheet is held by the sheet delivery roller 39 and the sheet delivery guide 41 to the point at which the original sheet comes in contact with the sheet delivery tray 11 becomes shorter than the length of the original sheet to be transported by the automatic original sheet feeder 301.

As a result of determining the length L, the original sheet to be delivered is arranged in such a manner that the front end of the original sheet is held by the sheet delivery tray 41 while the rear end of the original sheet is not delivered from the point at which the original sheet is held by the sheet delivery roller 39 and the sheet delivery guide 41. Therefore, the original sheet is made firm in the direction in which it is fed, causing the rear end of the original sheet to be prevented from being left at the point at which it is held by the sheet delivery roller 39 and the sheet delivery guide 41. As a result of this, the original sheet can be assuredly accommodated in the delivery sheet tray 11. Thanks to the thus-constituted structure, even if the sheet feeding speed is low, the performance of accommodating the original sheets can be improved.

The operation of the apparatus the structure of which has been described above will now be described.

In response to the instruction of photographing the original sheet from the control keyboard 328, the original sheet in the original sheet tray 307 is automatically transported through the transporting portion 309 to the point on the platen 305 at which the original sheet is photographed. Prior to this transportation of the original sheet, the control unit 218 of the main electrophotography apparatus body 210 first sends a sheet delivery command before sending a sheet supplying command when this command of photographing the original sheet is the first command (a long time period has been elapsed from the previous photographing) as a countermeasure against a case wherein a needless original sheet is set (for example, in case where an operator did not use the original sheet feeder and utilizes the original sheet as an alternative to a pressing plate (cover) after the original sheet has been set to the platen, and the operator left the original sheet as it is). The automatic original sheet feeder 301 starts its dummy sheet delivery operation when it receives the sheet delivery command.

That is, the automatic original sheet feeder 301 turns on a motor 49 after it receives the sheet delivery command, activates the clutch 57 after time period T1 has been elapsed, and starts its dummy sheet delivery operation. Then, it activates a motor 49 for time period T2. If the sensor 37 is activated during this time period, a jam state is displayed in a display (omitted from the illustration) of the original sheet feeder so as to inform the jam state to an operator and stops all of the operations determining the fact that an original sheet has been unintentionally set to the platen 305.

If the sensor 37 is not activated, it is determined that an original sheet is not unintentionally set to the platen 305, and it turns off the motor 49 after time period T2 has been elapsed, releases the clutch 57, and the dummy sheet delivery operation is completed.

Next, electricity is supplied to a motor 312 so that arrangement plates 308L and 308R of the original sheet tray 307 shown in FIG. 2 are set at the distance corresponding to the width of the original sheet to be fed which width has been previously input to the control keyboard 328. As a result of this, when the original sheet is transported onto the platen 305, the original sheet is located at the substantially transverse central portion of the platen 305. By so arranging the structure that the motor 312 is stopped when the load to the motor 312 exceeds a certain level, the size of the original sheet may be unknown.

Then, when the original sheet is, in this state, set in the original sheet tray 307 shown in FIG. 1, the original sheet is sent until it comes contact with the stopper 23. If the original sheet has been set, the setting of the original sheets is detected by the sensor 21 and the length of the original sheet to be fed by the motor 49 is calculated.

That is, provided that the distance from the stopper 23 to the central point of the platen 305 is F1, the length of the original sheet which has been previously inputted with the control keyboard is F2, the required distance F0 for the original sheet to be fed by the motor 49 is expressed by (F1+F2/2). It may be arranged that the required distance F0 is selected from the values which have been previously stored by inputting the lengths of the original sheets with the control keyboard. In this state, the solenoid 101 is turned on, causing the stopper 23 to be moved upwardly. Furthermore, the motor 49 is activated, whereby the original sheet is sent. The motor 49 rotates for a time period T0 corresponding to the required distance F0 for the original sheet to be fed, and stops. Simultaneously, the clutch 457 is released, while the brake 63 is activated, whereby the original sheet is assuredly stopped at the central portion of the platen 305. Then, the clutch 457, solenoid 101 and brake 63 are stopped.

Meanwhile, in a case where the lengths of the original sheet are not inputted with the control keyboard 328, an insertion of the original sheet along the original sheet tray 307 by an operator causes the sensor 21 to confirm the setting of the original sheet. As a result of this, the solenoid 101 is turned on, and the motor 49 is activated after time period T4 has been elapsed, and the sheet supplying operation is started.

When the sheet supplying operation is started, the original sheet starts its movement, and the number of the pulses generated by an encoder until the sensor 21 is turned off (the rear end of the original sheet is detected) is counted. As shown in FIG. 13, depending upon this count, the size of the original sheet can be determined, and the number of the pulses can be calculated, the number of pulses being the number of pulses which will be generated by the original sheet during the time period from turning off of the sensor 21 until the original sheet reaches the central portion of the platen 5. This number of pulses has been previously stored in a CPU as a fixed number of pulses. The original sheet is fed until the number of the pulses generated reaches the number which corresponds to the size of the original sheet. When the number of the pulses reaches it (when the count is made to coincide with the number), the motor 49 is stopped, the clutch 57 is released, and the brake 63 is activated, whereby the original sheet is stopped, and the sheet supplying operation is completed.

Then, the solenoid 101 is turned off after time period T5 has been elapsed.

Then, the brake 63 is released after time period T6 has been elapsed.

The means for determining the time period during which the motor 49 is activated for the purpose of stopping the original sheet at a predetermined position on the platen can be realized by, for example, inputting the size of the original sheet with the keyboard, selecting it by comparing in the CPU 218 the size of the original sheet with the fixed data provided for determining the time period during which the motor 49 is activated, and arithmetically processing in the CPU 218 the time period during which the motor 49 is activated depending upon the size of the original sheet.

When the original sheet is stopped on the platen 305, the frame of the electrophotographic film 324 which photographs it is charged by the charging mechanism of the process head 354. Next, the image of the original sheet which has been transported to the position at which photographing is performed is focused on the above-described charged frame of the electrophotographic film 324 by the optical system 333 for photographing. The frame on which the exposed-static latent image is formed is sent to the development portion 366 of the process head at which the latent image is realized since the liquid developer is supplied. Next, it is sent to the drying portion 368 and fixing portion 370 at which it is subjected to drying air so that the liquid developer is dried, and the realized image is fixed on the electrophotographic film 324 by the light of a xenon lamp or the like. As a result of the successive processes, the image of the original sheet 334 is recorded, as a micro-image, on a predetermined frame of the electrophotographic film 324.

Figure 14:
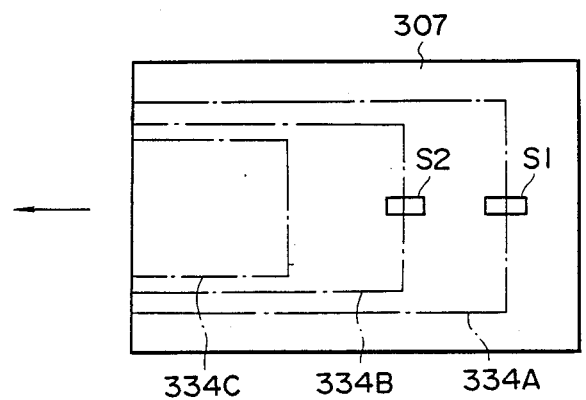
FIG. 14 is a plan view of an original sheet tray in which the structure for detecting the length of the original sheet according to another embodiment is illustrated.

Meanwhile, another example for detecting the size of the original sheet can be employed, as shown in FIG. 14, in which sensors S1 and S2 are provided on the original sheet tray 307 so that when a large sized original sheet 334A (A4 size) is fed the two sensors S1 and S2 are activated, when an intermediate sized original sheet 334B (B5 size) is fed the sensor S2 is activated, and when a small sized original sheet 334C (B6 size) is fed none of the sensors are activated.

When the sheet delivery command is received after the exposure has been completed, the motor 49 is activated, the clutch 57 is activated after time period T7 has been elapsed, and a sheet delivery operation starts. In this state, the activation of the sensor 37 is confirmed, the motor 49 is stopped after time period T8 has been elapsed from turning off, the clutch 57 is released, and the sheet delivery operation is completed.

The described is a case in which the original sheet is transported automatically. However, in a case where the original sheet is manually set to the platen 305, the platen 305 is opened by rotating the transporting portion 309 relative to hinges (omitted from the illustration) and the original sheet is abutted against the stopper 117 shown in FIG. 6 so as set it. Therefore, although the original sheet is set at substantially the central portion of the platen 305 in a case of automatic transporting of the original sheet, in a case of manual feeding, the original sheet is set setting off to one side. After the setting has been completed, the exposure operation is conducted by closing the transporting portion 9.

Meanwhile, as an alternative to the stopper 23 employed in the above-described embodiment, other stopping means may be employed. For example, rollers which hold the end portion of the original sheet may be employed.

Although in the above-described embodiment, the original sheets are supplied one by one to the original sheet tray 307, a plurality of the original sheets may be stacked on the original sheet tray 307 and sent one by one to the sheet supplying tray 17 by the rotation of a roller or the like.

Meanwhile, since the reader function for enlarging and projecting the image which has been recorded on an electrophotographic film and the copying function for copying the image which has been recorded on an electrophotographic film in an enlarged manner do not directly concern this invention, the description is omitted.

Electrophotography apparatuses of the type described above are disclosed in, for example, U.S. Pat. No. 4,671,648, or U.S. patent application Ser. No. 920,336.

Although in the above-described embodiment, an example is described in which the original sheet is stopped at the central portion or at substantially the central portion of the platen, the present invention does not mean the central portion in the strict sense of the word, but means the portion in the vicinity of the substantial central portion. Therefore, all modifications are included in which the location is not conducted at an end of the periphery portion, but the size of the sheet is detected and the location is conducted at the intermediate positions of the platen.

We claim:

1. An automatic original sheet feeder for automatically feeding an original sheet to a platen of an image processing apparatus comprising:
   (a) an original sheet tray for stacking an original sheet;
   (b) feeding means for moving said original sheet on said original sheet tray to said platen;
   (c) sheet delivery means for delivering said original sheet on said platen; and
   (d) control means for calculating the distance for said original sheet to be fed which is required to locate said original sheet at a substantially central position on said platen depending upon the length of the original sheet and the distance from a predetermined position to said substantially central position on said platen and activating said feeding means by said distance of said original sheet to be fed, wherein an image on said original sheet is formed at a central position of a frame defined on a photosensitive film as a microimage reduced by an optical system.

2. An automatic original sheet feeder according to claim 1, wherein a sensor for detecting the front and rear ends of said original sheet is provided in order to detect the length of said original sheet, and the length of said original sheet is calculated depending upon the time period between detections of said front and rear ends and the distance for said original sheet to be fed.

3. An automatic original sheet feeder according to claim 1, wherein input means for inputting said length of said original sheet to a control unit is provided.

4. An automatic original sheet feeder according to claim 1, wherein means is provided for making the transverse central portion of said original sheet coincide with the traverse central portion of said platen.

5. An automatic original sheet feeder according to claim 1, wherein said moving means is provided with arrangement means for pressing a transverse end of said original sheet to the transverse central portion by separating from and moving closer to each other said arrangement means.

6. An automatic original sheet feeder according to claim 1, wherein said control means locates said central portion of said original sheet at said central portion of said platen.

7. An automatic original sheet feeder according to claim 1, wherein said length of said original sheet is detected by a plurality of sensors provided on said original sheet tray.

8. An automatic original sheet feeder according to claim 1, wherein means is included for detecting said length of said original sheet depending upon said distance for said original sheet to be fed during a sensor detecting said original sheet.

* * * * *

UNITED STATES PATENT AND TRADEMARK OFFICE
CERTIFICATE OF CORRECTION

PATENT NO. : 4,982,228
DATED : January 1, 1991
INVENTOR(S) : Kazuo WATANABE

It is certified that error appears in the above-identified patent and that said Letters Patent is hereby corrected as shown below:

On the title page, under Item [19], after "Watanabe", insert --et al.--; and in
Item [75] Inventor: Please add the names of the second and third inventors as indicated on the Declaration filed May 18, 1988:

--Takehiko SUICHI of Yamanashi-ken, Japan and

Yoshihumi KASAI of Yamanashi-ken, Japan--.

Signed and Sealed this

Fourteenth Day of July, 1992

Attest:

DOUGLAS B. COMER

*Attesting Officer*  *Acting Commissioner of Patents and Trademarks*